United States Patent [19]

Freppon et al.

[11] Patent Number: 4,717,787
[45] Date of Patent: Jan. 5, 1988

[54] THERMOELEMENT FOR MEASUREMENT OF TEMPERATURE IN VACUUM FURNACES

[75] Inventors: Willi Freppon, Freigericht; Paul Heilmann, Maintal, both of Fed. Rep. of Germany; Theo van Heijst, Nuenen, Netherlands

[73] Assignee: Degussa Aktiengesellschaft, Frankfurt, Fed. Rep. of Germany

[21] Appl. No.: 892,647

[22] Filed: Aug. 4, 1986

[30] Foreign Application Priority Data

Aug. 6, 1985 [DE] Fed. Rep. of Germany ....... 3528161

[51] Int. Cl.⁴ ............................................ H01L 35/28
[52] U.S. Cl. ...................................... 136/226; 136/213
[58] Field of Search ................. 136/226, 213; 374/179

[56] References Cited

U.S. PATENT DOCUMENTS

| 813,682 | 2/1906 | Wilderman et al. | 136/226 |
| 2,672,492 | 3/1954 | Sukucev | 136/226 |
| 3,199,352 | 8/1965 | Macatician | 136/226 |

Primary Examiner—Stephen C. Bentley
Assistant Examiner—T. Wallen
Attorney, Agent, or Firm—Beveridge, Degrandi & Weilacher

[57] ABSTRACT

A thermoelement which rapidly determines temperature and which is protected from disturbing signals during the measurement of temperature in a vacuum furnace composed of a thermocouple which is protectively sheathed by a transparent quartz glass portective tubing pipe which has wrapped around it a continuous conductive metal element which is grounded.

4 Claims, 1 Drawing Figure

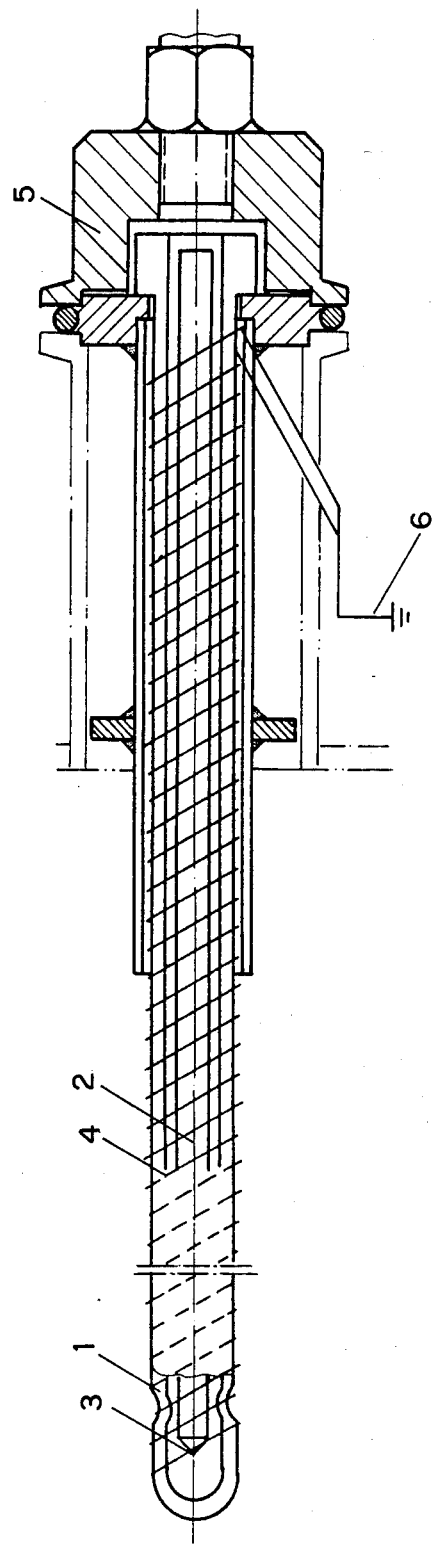

THERMOELEMENT FOR MEASUREMENT OF TEMPERATURE IN VACUUM FURNACES

The present invention relates to a thermoelement comprising a thermocouple and a protective tubular covering for the measurement of temperatures in vacuum furnaces in the range of 300° to 1300° C.

Temperature control in vacuum furnaces is accomplished under normal circumstances by using thermoelements formed of a thermocouple, primarily platinum/platinum rhodium and a protective tube. As the protective tube material, ceramic material is largely used, particularly aluminum oxide. According to the thickness of the wall and the temperature range to be measured and controlled, the protective tube causes a delay in the measurement of the temperature at the thermocouple. Particularly in the temperature range of 300° to 600° C. this noticeable delay can assume a considerable magnitude. In addition, it has been determined that on thermoelements with non-metallic protective tubes disturbing stresses are easily transmitted and as a result the entire measuring system is rendered unsuitable.

It was therefore the object of the present invention to provide a thermoelement comprising a thermocouple and a protective pipe or tube covering for the measurement of temperatures in vacuum furnaces in the range of 300° to 1300° C., which also leads to a rapid determination of temperature at relatively low furnace temperatures and which in addition provides for protection against disturbing stresses.

This object of the present invention is achieved by providing a thermocouple protective pipe made of quartz glass and which is grounded with a metallic wire which is wrapped around the pipe.

Preferably, 1 to 5 wire wrappings are utilized per centimeter of protective pipe length whereby the wire wrappings lie directly on the protective pipe. The windings are based on continuous metal wire of suitable compositions.

The quartz glass is transparent to light and infrared rays and therefore very quickly transmits even the relatively weak heatwaves to the thermocouple even at relatively low temperature ranges so that the temperatures utilized in the vacuum furnace are essentially quickly determined and precisely measured as compared to thermoelements that have conventional ceramic protective pipes.

The windings with a grounded metal wire protects the thermoelement from electrical disturbing influences in the furnace without hindering the transmissivity of the rays through the protective tube. Suitable wire materials that can be used depending upon the temperature of the furnace are chrome nickel, molybdenum and platinum.

The invention may be further understood with reference to the FIGURE which shows in a schematic representation the thermoelement of the present invention.

Described in further detail, the drawing shows a thermoelement which is comprised of a protective tubing, circular in cross section, (1) made of quartz glass in which there is formed a carrier body (2) which has formed therein the thermocouple (3). The protective tubing (1) has wound around its outer surface at least one metal wire (4) in a plurality of turnings. The wire is in direct contact with the quartz tube. The tube is positioned in a holder (5) of any conventional configuration. The metal wire windings (4) are grounded (6) through any conventional means. The size and dimensions of the thermoelement of the present invention are conventional and any shape or configuration can be use. Likewise, the housing (5) is of a conventional nature and may be changed in accordance with the desired utilization and design of the vaccum furnace.

Further variations and modifications of the present invention will be apparent to those skilled in the art and such are intended to be encompassed by the claims appended hereto.

The German patent application No. P 35 28 161.8 with the priority of Aug. 6, 1985 is relied on and incorporated herein by reference.

We claim:

1. A thermoelement for measuring temperatures in a range of 300° to 1300° C. in a vacuum furnace, the thermoelement comprising a thermocouple, a protective tubing formed of quartz glass for enclosing the thermocouple, and a metal wire wound in a plurality of windings around the quartz glass protective tubing, the wire being grounded such that said grounded metal wire protects the thermoelement from electrical disturbing influences without hindering the transmissivity of the protective tubing to light and infrared rays.

2. The thermoelement according to claim 1, wherein the the protective tubing has 1 to 5 windings per centimeter.

3. The thermoelement according to claim 2, wherein the metal wire is a member selected from the group consisting of chrome nickel, molybdenum and platinum.

4. The thermoelement according to claim 1, wherein the wire is wound directly on the quartz glass surface.

* * * * *